United States Patent
Akiyama

(10) Patent No.: US 7,252,410 B2
(45) Date of Patent: Aug. 7, 2007

(54) PROJECTOR

(75) Inventor: Koichi Akiyama, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 45 days.

(21) Appl. No.: 11/231,945

(22) Filed: Sep. 22, 2005

(65) Prior Publication Data

US 2006/0077666 A1 Apr. 13, 2006

(30) Foreign Application Priority Data

Sep. 30, 2004 (JP) ............................. 2004-288674

(51) Int. Cl.
*F21V 7/00* (2006.01)
(52) U.S. Cl. ........................................ 362/296; 353/99
(58) Field of Classification Search ................ 362/296; 353/37, 98, 99
See application file for complete search history.

(56) References Cited

U.S. PATENT DOCUMENTS

| 5,491,525 | A | 2/1996 | Yamasaki et al. | |
|---|---|---|---|---|
| 6,851,811 | B2* | 2/2005 | Akiyama | 353/31 |
| 7,052,139 | B2* | 5/2006 | Akiyama | 353/38 |
| 7,052,140 | B2* | 5/2006 | Akiyama | 353/38 |
| 7,086,739 | B2* | 8/2006 | Kida et al. | 353/52 |
| 7,125,123 | B2* | 10/2006 | Kwon et al. | 353/84 |
| 2004/0046941 | A1* | 3/2004 | Yamamoto | 353/31 |
| 2004/0070738 | A1* | 4/2004 | Sekiguchi et al. | 353/102 |
| 2004/0145711 | A1* | 7/2004 | Takezawa et al. | 353/122 |
| 2004/0165156 | A1* | 8/2004 | Akiyama | 353/84 |
| 2005/0018145 | A1* | 1/2005 | Kwon et al. | 353/84 |
| 2005/0151937 | A1* | 7/2005 | Sugitani | 353/85 |
| 2005/0157501 | A1* | 7/2005 | Akiyama et al. | 362/299 |
| 2006/0023174 | A1* | 2/2006 | Kang et al. | 353/97 |
| 2006/0092390 | A1* | 5/2006 | Akiyama | 353/102 |
| 2006/0119802 | A1* | 6/2006 | Akiyama | 353/94 |
| 2006/0164601 | A1* | 7/2006 | Akiyama | 353/33 |
| 2006/0187417 | A1* | 8/2006 | Akiyama et al. | 353/33 |
| 2006/0187418 | A1* | 8/2006 | Akiyama | 353/33 |
| 2006/0192922 | A1* | 8/2006 | Akiyama | 353/33 |
| 2006/0244926 | A1* | 11/2006 | Shih et al. | 353/54 |
| 2006/0244929 | A1* | 11/2006 | Sawai et al. | 353/84 |

FOREIGN PATENT DOCUMENTS

| CN | 1101753 A | 4/1995 |
|---|---|---|
| EP | 0 617 300 A1 | 9/1994 |
| JP | A 09-120067 | 5/1997 |
| JP | A-2001-290218 | 10/2001 |
| JP | A 2003-222820 | 8/2003 |
| JP | A 2005-505909 | 2/2005 |
| WO | WO 03/033959 | 4/2003 |

\* cited by examiner

*Primary Examiner*—Ross Gushi
(74) *Attorney, Agent, or Firm*—Oliff & Berridge, PLC

(57) ABSTRACT

A projector includes an illumination system including a light source having an ellipsoidal reflector and an arc tube having a luminescence center in the vicinity of a first focus of the ellipsoidal reflector, and an integrator rod having a light incidence plane in the vicinity of a second focus of the ellipsoidal reflector and converting light from the light source to light having a more even intensity distribution; a relay optical system that guides the light from the illumination system to a region being illuminated; a micromirror modulator that modulates the light from the relay optical system in accordance with image information; and a projection optical system that projects the light modulated by the micromirror modulator. The arc tube includes an auxiliary mirror that reflects the light radiated from the arc tube toward the region being illuminated into a direction of the ellipsoidal reflector.

10 Claims, 13 Drawing Sheets

$f_1$=9.3mm  $f_2$=60mm

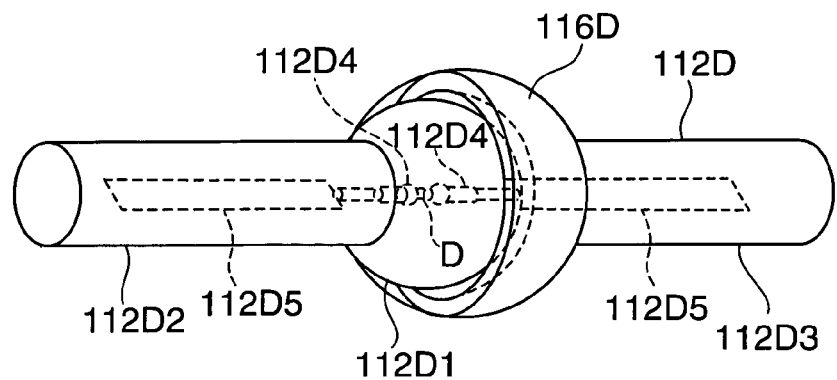
FIG. 7
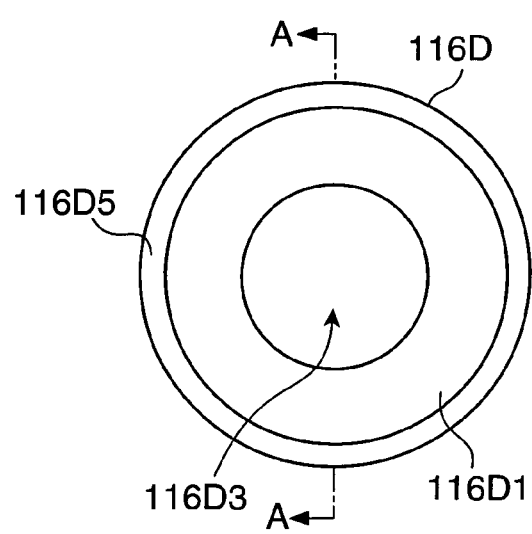 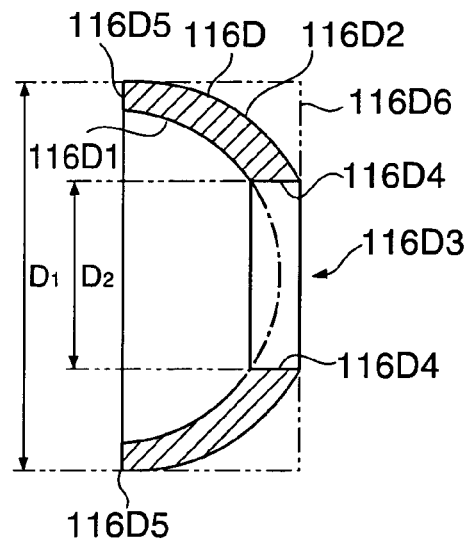
FIG. 8A    FIG. 8B

PROJECTOR

This application claims the benefit of Japanese Patent Application No. 2004-288674 filed Sep. 30, 2004. The entire disclosure of the prior application is hereby incorporated by reference herein its entirety.

BACKGROUND

The exemplary embodiments relate to a projector.

FIG. 12A is an explanatory diagram of an optical system of a related-art projector 1000a that includes a micromirror modulator. FIG. 12B is an explanatory diagram of a light source 110a of the related-art projector 1000a that includes a micromirror modulator.

As shown in FIG. 12A, the related-art projector 1000a that includes a micromirror modulator, includes an illumination system 100a. The illumination system 100a has a light source 110a that emits converging light, and an integrator rod 120a that converts the light from the light source 110a to light having a more even intensity distribution. The projector 1000a also has a relay optical system 140a that guides the light from the illumination system 100a to a region being illuminated, a micromirror modulator 200a that modulates the light from the relay optical system 140a in accordance with image information, and a projection optical system 300a that projects the light modulated by the micromirror modulator 200a. The projector 1000a further has a color wheel 130a on the light incident side of the integrator rod 120a.

As shown in FIG. 12B, the light source 110a includes an ellipsoidal reflector 114a, an arc tube 112a having a luminescence center in the vicinity of a first focus of the ellipsoidal reflector 114a, and a reflection system 160. The reflection system 160 allows the light in the center of the converging light exiting from the ellipsoidal reflector 114a to pass through, and reflects light in the periphery back to the direction opposite to the direction of incidence.

Thus, with the related-art projector 1000a that includes a micromirror modulator, the angle of the converging light emitted from the light source 110a can be decreased by the operation of the reflection system 160. Accordingly, the angle of incidence of the converging light that enters the integrator rod 120a can be decreased, allowing the light utilization efficiency of the illumination system to easily be increased (for example, refer to JP-A-2003-222820).

However, in the related-art projector 1000a that includes a micromirror modulator, the reflection system 160 must have an equal size to that of the ellipsoidal reflector 114a since it needs to reflect the peripheral light of the converging light exiting from the ellipsoidal reflector 114a. The related art projector 1000a thus poses the problem of an increasing scale of the light source. This results in decreasing the efficiency of cooling the light source because the large-scale reflection system 160 closes the opening of the ellipsoidal reflector 114a.

Accordingly, in the related-art projector 1000a that includes a micromirror modulator, a reflection system 170, as shown in FIG. 13, can be used in place of the reflection system 160 to simplify the structure of the light source and to prevent a decrease in light-source cooling efficiency. FIG. 13 shows another related-art light source 110b.

As shown in FIG. 13, the related-art light source 110b includes an ellipsoidal reflector 114b, an arc tube 112b having a luminescence center in the vicinity of a first focus of the ellipsoidal reflector 114b, and the reflection system 170 that reflects the light radiated from the ellipsoidal reflector 114b to the region being illuminated back to the ellipsoidal reflector 114b. The reflection system 170 is made of a reflection film formed on the outer surface of the bulb of the arc tube 112b.

Thus, with the related-art light source 110b, the reflection system 170 can reflect the light radiated from the ellipsoidal reflector 114b toward a region being illuminated with the reflection film formed on the outer surface of the bulb of the arc tube 112b, simplifying the light source. This also prevents or discourages a decrease in the light-source cooling efficiency (for example, refer to International Publication No. 03-033959).

However, an analysis of the inventor shows that arc tubes that are in circulation at present vary to a non-negligible extent in shape and size of the bulb, the position of the electrodes, and the position of the luminescence center from one arc tube to another. Accordingly, the use of the reflection system 170 for the light source 110b of the projector 1000a having a micromirror modulator, in place of the reflection system 160, ensures simplification of the light source and prevents or discourages a decrease in the light-source cooling efficiency. On the other hand, the light reflected by the reflection system 170 toward the ellipsoidal reflector does not necessarily pass through the illuminator of the arc tube. As a result, part of the light reflected by the ellipsoidal reflector 114b does not reach the plane of incidence of the integrator rod 120a, decreasing light utilization efficiency and increasing stray light.

SUMMARY

In an exemplary embodiment, a projector including a micromirror modulator is provided in which the light utilization efficiency is not decreased, and stray light is not increased, even when the light source has a reflection system that reflects part of the light from the arc tube toward an ellipsoidal reflector.

A projector according to an exemplary embodiment may include an illumination system including a light source having an ellipsoidal reflector and an arc tube having a luminescence center in the vicinity of a first focus of the ellipsoidal reflector, and an integrator rod having a light incidence plane in the vicinity of a second focus of the ellipsoidal reflector and converting light from the light source to light having a more even intensity distribution; a relay optical system that guides the light from the illumination system to a region being illuminated; a micromirror modulator that modulates the light from the relay optical system in accordance with image information; and a projection optical system that projects the light modulated by the micromirror modulator. The arc tube includes an auxiliary mirror that reflects light radiated from the arc tube toward the region being illuminated into a direction of the ellipsoidal reflector.

In the projector according to an exemplary embodiment, the arc tube includes the auxiliary mirror serving as a reflection system, so that the angle of converging light emitted from the light source can be decreased. Thus the angle of incidence of the converging light incident on the integrator rod can be decreased, facilitating an increase of the illumination-light utilization efficiency of the illumination system.

In the projector according to an exemplary embodiment, the arc tube includes the auxiliary mirror serving as reflection system. Thus, even if arc tubes vary to a non-negligible extent in shape and size of the bulb, the position of the electrodes, and the position of the luminescence center from one arc tube to another, the variations can be eliminated by adjusting the position of the auxiliary mirror relative to the arc tube, depending on the variations. Accordingly, even if the light source in the projector, including the micromirror modulator, includes a reflection system that reflects part of the light from the arc tube toward the ellipsoidal reflector, light utilization efficiency does not decrease, and stray light does not increase.

In an exemplary embodiment the auxiliary mirror is fixed to the arc tube after the position of the auxiliary mirror relative to the arc tube has been adjusted.

With such a structure, the auxiliary mirror is fixed to the arc tube after the mounting position of the auxiliary mirror relative to the arc tube is adjusted to eliminate or minimize the variations. The fixed auxiliary mirror can therefore reflect the light radiated from the arc tube toward the region being illuminated into the direction of the illuminator of the arc tube accurately at all times. The light that has passed through the illuminator of the arc tube may then be accurately reflected by the ellipsoidal reflector onto the light incidence plane of the integrator rod accurately, so that light utilization efficiency does not decrease and stray light does not increase.

In an exemplary embodiment the auxiliary mirror is fixed to a sealed portion of the arc tube opposite to the ellipsoidal reflector.

This structure facilitates the work to adjust the position of the auxiliary mirror relative to the arc tube and then fix the auxiliary mirror to the arc tube.

In an exemplary embodiment, the auxiliary mirror is made of quartz glass.

In an exemplary embodiment, the auxiliary mirror may be under an extremely high-temperature environment because the auxiliary mirror is disposed in close vicinity to the arc tube. However, degradation in optical characteristic due to heat can be minimized or prevented because the auxiliary mirror is made of quartz glass that has a low thermal expansion coefficient and high thermal resistance.

In an exemplary embodiment, the auxiliary mirror has an inner surface and a dielectric-multilayer reflection film on the inner surface.

In an exemplary embodiment, the auxiliary mirror may be under an extremely high-temperature environment because the auxiliary mirror is disposed in close vicinity to the arc tube, as described above. However, degradation in reflection characteristic due to heat can also be minimized or prevented because the reflection film is made of dielectric multilayer film having a low expansion coefficient and high thermal resistance.

In an exemplary embodiment, an infrared transmissive reflection film is used as the reflection film of the auxiliary mirror. Therefore, infrared light radiated from the arc tube onto the auxiliary mirror may pass through the auxiliary mirror, preventing or discouraging an increase in the temperature of the auxiliary mirror.

The dielectric multilayer film may thus be made of silicon dioxide serving as a low-refractive index dielectric, and titanium dioxide and/or tantalum pentoxide serving as a high-refractive index dielectric.

In an exemplary embodiment, the ellipsoidal reflector is provided such that 6 mm$\leq f_1 \leq$18 mm, where $f_1$ is a first focal length of the ellipsoidal reflector. More specifically, when the first focal length $f_1$ of the ellipsoidal reflector becomes less than 6 mm, the distance between the luminescence center of the arc tube and the base of the ellipsoidal reflector becomes too short, raising the possibility of bringing the bulb portion (normally about 9 mm in diameter) of the arc tube and the base of the ellipsoidal reflector into contact with each other.

On the other hand, when the first focal length $f_1$ of the ellipsoidal reflector becomes larger than 18 mm, the need for using a large ellipsoidal reflector having a large-diameter effective reflective surface arises to ensure high incidence of light from the arc tube. This makes it difficult to reduce the size of the illumination system.

Thus, in an exemplary embodiment, the ellipsoidal reflector is provided such that 9 mm$\leq f_1 \leq$15 mm.

In an exemplary embodiment, the ellipsoidal reflector is provided such that 30 mm$\leq f_2 \leq$90 mm, where $f_2$ is a second focal length of the ellipsoidal reflector.

Specifically, when the second focal length $f_2$ of the ellipsoidal reflector becomes less than 30 mm, the distal end of the lead portion of the arc tube close to the region being illuminated (normally 20 to 35 mm apart from the luminescence center of the arc tube) and the light incidence plane of the integrator rod may come into contact with each other.

On the other hand, when the second focal length $f_2$ of the ellipsoidal reflector becomes more than 90 mm, the need for relatively increasing the first focal length $f_1$ of the ellipsoidal reflector may arise, creating the need for using a large ellipsoidal reflector having a large-diameter effective reflective surface to ensure high incidence of light from the arc tube. This makes it difficult to reduce the size of the illumination system.

In an exemplary embodiment, the ellipsoidal reflector is provided such that 30 mm$\leq D \leq$50 mm, where D is the diameter of the effective reflective surface of the ellipsoidal reflector.

Specifically, when the diameter D of the effective reflection surface of the ellipsoidal reflector becomes less than 30 mm, the reflection area of the ellipsoidal reflector that reflects the light from the arc tube becomes too small, raising the possibility of shortage of light guided to the integrator rod.

On the other hand, when the diameter D of the effective reflection surface of the ellipsoidal reflector becomes more than 50 mm, the ellipsoidal reflector itself becomes too large, making it difficult to reduce the size of the illumination system.

In an exemplary embodiment, the illumination system is provided such that 90°$\leq \theta \leq$110°, where $\theta$ is the maximum angle made by the illumination light axis of the illumination system at the base end of the ellipsoidal reflector and the light radiated from the luminescence center of the arc tube toward the ellipsoidal reflector.

Specifically, when the angle $\theta$ becomes less than 90°, the reflection area of the ellipsoidal reflector that reflects the light from the arc tube becomes too small, raising the possibility of a shortage of light guided to the integrator rod.

On the other hand, when the angle $\theta$ becomes more than 110°, the ellipsoidal reflector itself becomes too large, making it difficult to reduce the size of the illumination system.

Thus, the projector according to the exemplary embodiments has a smaller ellipsoidal reflector than related-art projectors. However, the light emitted from the arc tube at angles larger than 110° is reflected by the auxiliary mirror onto the ellipsoidal reflector, thus preventing or discouraging a decrease in light utilization efficiency.

In an exemplary embodiment, the projector further includes a color wheel disposed on the light exiting plane side of the integrator rod.

In an exemplary embodiment, the light exiting plane of the integrator rod is in an optically conjugate position with the image forming region of the micromirror modulator. The color wheel is disposed close to the region being illuminated relative to the light exiting plane of the integrator rod. Therefore images on the image forming region of the micromirror modulator, on the boundaries of the color filters of the color wheel, may be somewhat out of focus.

However, with the projector according to the exemplary embodiments, the angle of the converging light emitted from the light source can be decreased, so that the angle of incidence of the converging light incident on the integrator rod can be decreased. As a result, the angle of the light exiting from the integrator rod can be decreased and as such, the blur of the images on the image forming region of the micromirror modulator on the boundaries of the color filters can be reduced or minimized, thus improving color reproducibility.

BRIEF DESCRIPTION OF THE DRAWINGS

The exemplary embodiments will be described with reference to the accompanying drawings, wherein like numbers reference like elements, and wherein:

FIG. 7 is an explanatory diagram of an arc tube and an auxiliary mirror in the light source according to the fourth exemplary embodiment;

FIG. 8A is a diagram of the auxiliary mirror, as viewed along a light-source optical axis according to the fourth exemplary embodiment;

FIG. 8B is a cross-sectional view of the auxiliary mirror, taken along line A—A of FIG. 8A according to the fourth exemplary embodiment;

DETAILED DESCRIPTION OF EMBODIMENTS

A projector according to the exemplary embodiments will be described hereinbelow with reference to the figures.

[First Exemplary Embodiment]

Figure 1A:
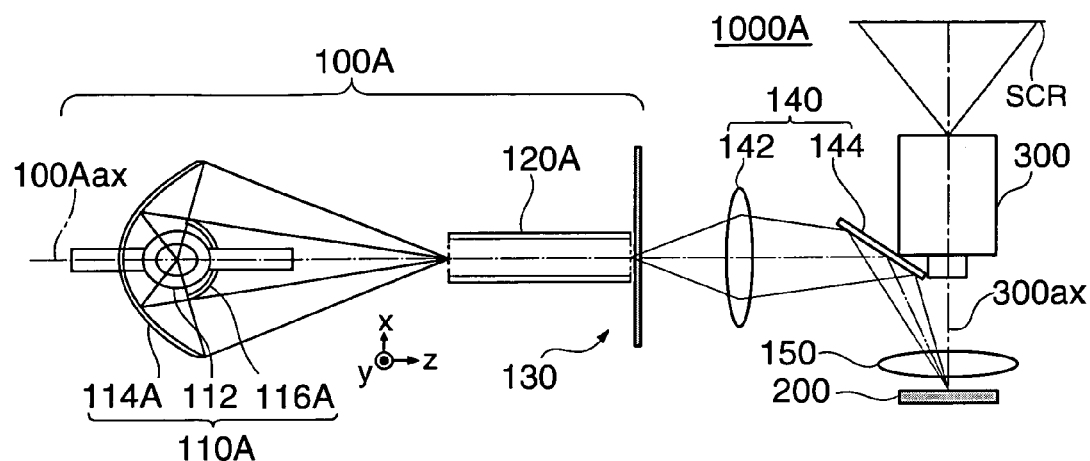
FIG. 1A is a top view of the optical system of a projector according to a first exemplary embodiment.
Figure 1B:
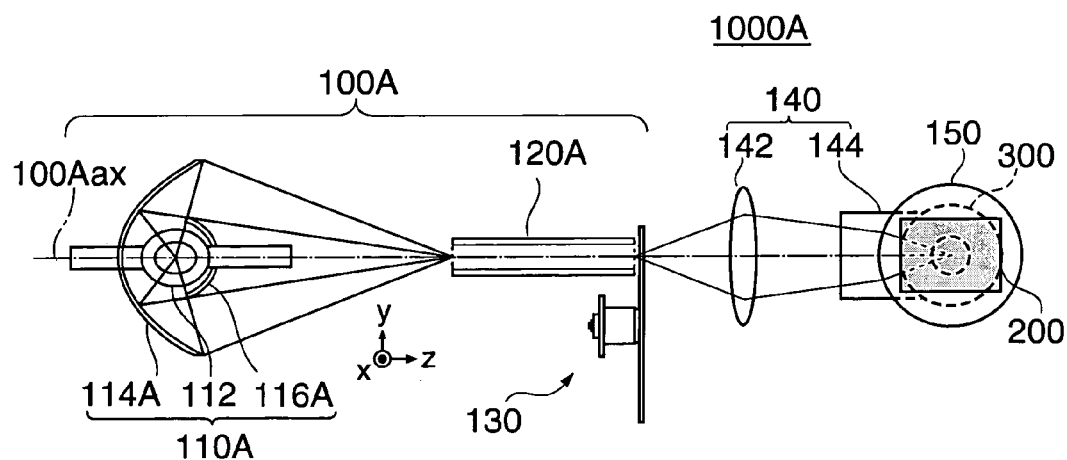
FIG. 1B is a side view of the optical system of the projector according to the first exemplary embodiment.
Figure 1G:
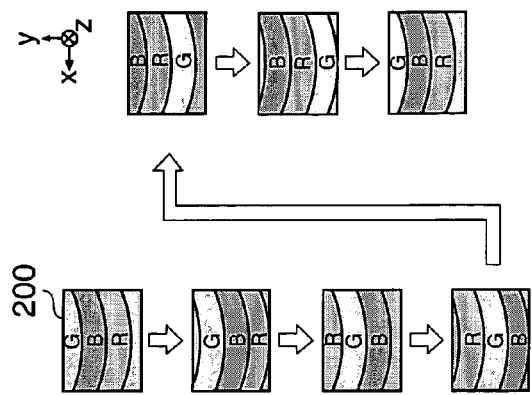
FIG. 1G is a diagram of illumination light applied to a micromirror modulator according to the first exemplary embodiment.
Figure 1F:
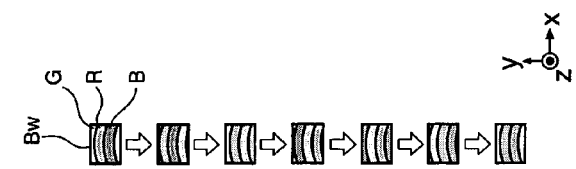
FIG. 1F is a diagram of illumination light passing through the color wheel, as viewed along the axis of illumination light according to the first exemplary embodiment.
Figure 1D:
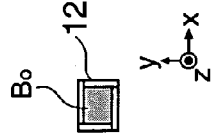
FIG. 1D is a diagram of the light exiting plane of the integrator rod, as viewed along the axis of illumination light according to the first exemplary embodiment.
Figure 1C:
FIG. 1C is a diagram of the light incidence plane of an integrator rod, as viewed along the axis of illumination light according to the first exemplary embodiment.
Figure 1E:
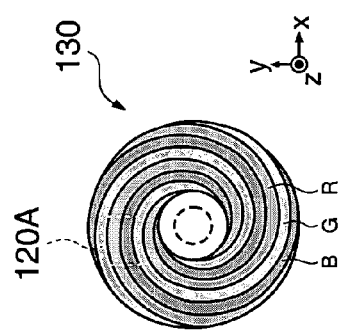
FIG. 1E is a diagram of a color wheel, as viewed along the axis of illumination light according to the first exemplary embodiment.

FIGS. 1A to 1G are explanatory diagrams of a projector 1000A according to a first exemplary embodiment, wherein FIG. 1A is a top view of the optical system of the projector 1000A, FIG. 1B is a side view of the same, FIG. 1C is a diagram of the light incidence plane of an integrator rod 120A as viewed along the axis of illumination light, FIG. 1D is a diagram of the light exiting plane of the integrator rod 120A as viewed along the axis of illumination light, FIG. 1E is a diagram of a color wheel 130 as viewed along the axis of illumination light, FIG. 1F is a diagram of illumination light Bw passing through the color wheel 130 as viewed along the axis of illumination light, and FIG. 1G is a diagram of illumination light applied to a micromirror modulator 200.

Three directions intersecting at right angles include a z-axis (the axis 100Aax of illumination light in FIG. 1A), an x-axis (parallel to the sheet of paper and orthogonal to the z-axis in FIG. 1A), and a y-axis (perpendicular to the sheet of paper and orthogonal to the z-axis in FIG. 1A).

As shown in FIGS. 1A and 1B, the projector 1000A, according to the first exemplary embodiment, includes an illumination system 100A having a light source 110A that emits converging light, and an integrator rod 120A that converts the light from the light source 110A to light having more even intensity distribution. The projector further includes a relay optical system 140 that guides the light from the illumination system 100A to a region being illuminated, a micromirror modulator 200 that modulates the light from the relay optical system 140 in accordance with image information, and a projection optical system 300 that projects the light modulated by the micromirror modulator 200.

As shown in FIGS. 1A and 1B, the light source 110A includes an ellipsoidal reflector 114A and an arc tube 112 having a luminescence center in the vicinity of a first focus of the ellipsoidal reflector 114A, which will be described later. The arc tube 112 includes an auxiliary mirror 116A serving as a reflection system that reflects light radiated from the arc tube 112 toward the region being illuminated in the direction of the ellipsoidal reflector 114A. The light source 110A emits light that converges in the vicinity of the light incidence plane of the integrator rod 120A.

In an exemplary embodiment the light exiting plane of the integrator rod 120A is shaped so that the outline of the illuminating region becomes similar to the outline of the region being illuminated. For example, if the outline of the region being illuminated is substantially rectangular, the outline of the light exiting plane of the integrator rod 120A is similarly substantially in a rectangle. However, the central axis of the light source 110A is inclined relative to the central axis of the micromirror modulator 200, so that the outline of an actual illuminating region to illuminate the region being illuminated is deformed by the inclination. Accordingly, in this exemplary embodiment, the light exiting plane of the integrator rod 120A is shaped to correct the deformation of the outline of the illuminating region.

The light incident on the integrator rod 120A passes through the integrator rod 120A while repeating reflection inside the integrator rod 120A. This allows the integrator rod 120A to make light having uneven intensity distribution which is emitted from the light source 110A even in illumination in the light exiting plane.

The color wheel 130 provide the integrator rod 120A on the light exiting plane side. As shown in FIG. 1E, the color wheel 130 has red, green, and blue spiral color filters. The color wheel 130 can also be omitted, in which case the projection image is monochrome.

The relay optical system 140 has the function of imaging the image on the light exiting plane of the integrator rod 120A onto the image forming region of the micromirror modulator 200. While a relay lens 142 shown in FIG. 1A includes one lens, the relay lens 142 may be a composite lens including multiple lenses.

The micromirror modulator 200 is a reflecting-direction controlling light modulator that has the function of sending image light indicative of images to the projection optical system 300 by reflecting the light from the relay optical system 140 in response to an image signal (image information) with a micromirror corresponding to each pixel. The image light emerging from the micromirror modulator 200 is projected onto a projection surface such as a screen SCR via the projection optical system 300. Thus, an image indicated by image light is displayed on the screen surface.

The micromirror modulator 200 and the projection optical system 300 are disposed such that their respective central axes agree with each other.

The illumination light emitted from the light source 10A becomes illumination light Bi having a circular cross section on the light incidence plane of the integrator rod 120A, as shown in FIG. 1C, while it becomes illumination light Bo having a rectangular cross section on the light exiting plane of the integrator rod 120A, as shown in FIG. 1D. As shown in FIG. 1E, the illumination light Bo passes through the color wheel 130 to form illumination light Bw containing three color components of red, green, and blue, as shown in FIG. 1F. The illumination light Bw is magnified by the relay optical system 140, as shown in FIG. 1G, and applied onto the image forming region of the micromirror modulator 200.

The light source 110A will now be described.

In the projector 1000A according to the first exemplary embodiment, the arc tube 112 includes an auxiliary mirror 116A, as shown in FIGS. 1A and 1B.

The angle of the converging light emitted from the light source 110A can thus be decreased. As a result, the angle of incidence of the converging light incident on the integrator rod 120A can be decreased, facilitating an increase in the illumination-light utilization efficiency of the illumination system 100A.

As shown in FIGS. 1A and 1B, in the projector 1000A according to the first exemplary embodiment, the arc tube 112 has a bulb portion expanding in the center and sealed portions extending from the bulb portion to both sides. The ellipsoidal reflector 114A is attached to the one sealed portion of the arc tube 112, while the auxiliary mirror 116A is attached to the other sealed portion.

Thus, even if arc tubes vary to a non-negligible extent in shape and size of the bulb, the position of the electrodes, and the position of the luminescence center from one arc tube to another; the variations can be eliminated by adjusting the position of the auxiliary mirror relative to the arc tube, depending on the variations. Accordingly, in the projector 1000A according to the first exemplary embodiment, including the micromirror modulator 200, light utilization efficiency does not decrease, and stray light does not increase.

In the projector 1000A, according to the first embodiment, the auxiliary mirror 116A is fixed to the arc tube 112, after the position relative to the arc tube 112 has been adjusted.

Accordingly, since the auxiliary mirror 116A is fixed to the arc tube 112, after the mounting position of the auxiliary mirror 116A relative to the arc tube 112 is adjusted to eliminate the variations, the fixed auxiliary mirror 116A can accurately reflect the light radiated from the arc tube 112 toward the region being illuminated in the direction of the illuminator of the arc tube 112. The light that has passed through the illuminator of the arc tube 112 is thereafter reflected by the ellipsoidal reflector 114A to accurately reach the light incidence plane of the integrator rod 120A so that light utilization efficiency does not decrease and stray light does not increase.

In the projector 1000A according to the first exemplary embodiment, the arc tube 112 has a bulb portion expanding in the center and sealed portions extending from the bulb portion to both sides. The ellipsoidal reflector 114A is attached to the one sealed portion of the arc tube 112, while the auxiliary mirror 116A is attached to the other sealed portion of the arc tube 112 that is opposite to the ellipsoidal reflector 114A.

This facilitates adjusting the position of the auxiliary mirror 116A relative to the arc tube 112 and then fixing the auxiliary mirror 116A to the arc tube 112.

In the projector 1000A according to the first exemplary embodiment, the auxiliary mirror 116A is made of quartz glass. A dielectric-multilayer reflection film is formed inside the auxiliary mirror 116A.

The auxiliary mirror 116A may be under an extremely high-temperature environment because it is disposed in close vicinity to the arc tube 112. However, degradation in optical characteristic due to heat can be prevented or discouraged because the auxiliary mirror is made of quartz glass which has a low thermal expansion coefficient and high thermal resistance, as in the projector 1000A, according to the first exemplary embodiment. Degradation in reflection characteristic due to heat can also be prevented or minimized because the reflection film is made of dielectric multilayer film having a low expansion coefficient and high thermal resistance.

In the projector 1000A according to the first exemplary embodiment, an infrared-transmissive reflection film is used as the reflection film of the auxiliary mirror 116A. Therefore, infrared light radiated from the arc tube 112 onto the auxiliary mirror 116A passes through the auxiliary mirror 116A, preventing or discouraging an increase in the temperature of the auxiliary mirror 116A.

Accordingly, in the projector 1000A according to the first exemplary embodiment, a dielectric multilayer film made of silicon dioxide serving as low-refractive index dielectric and titanium dioxide and/or tantalum pentoxide serving as high-refractive index dielectric is used.

Figure 2A:
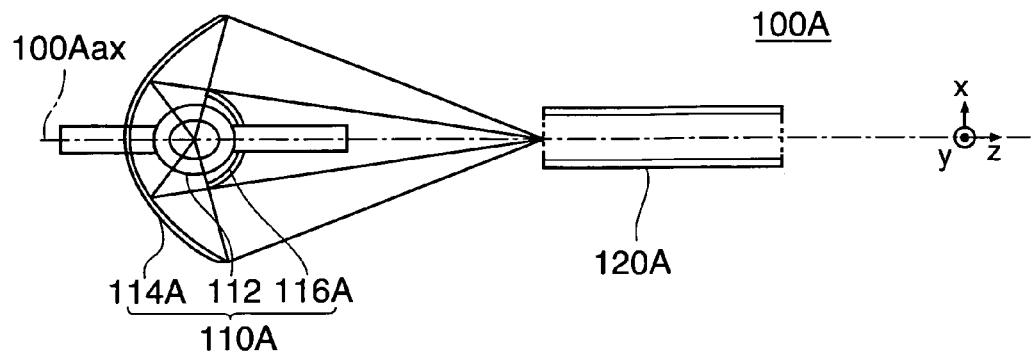
FIG. 2A is a top view of an illumination system including the light source according to the first exemplary embodiment.
Figure 2B:
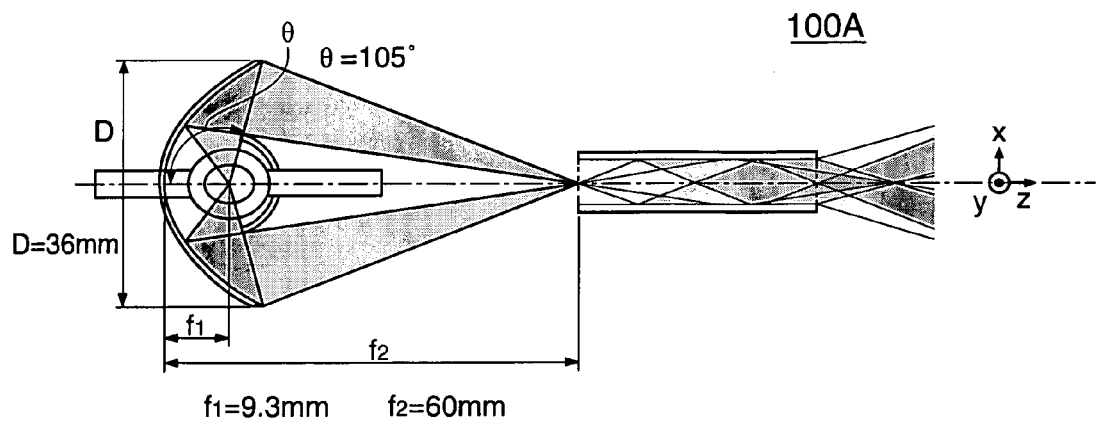
FIG. 2B is a top view of the illumination system incorporating illumination light according to the first exemplary embodiment.

FIGS. 2A and 2B are explanatory diagrams of the light source 110A of the projector 1000A according to the first exemplary embodiment, wherein FIG. 2A is a top view of the illumination system 100A including the light source 110A, and FIG. 2B is a top view of the illumination system 100A incorporating the illumination light.

Figure 3A:
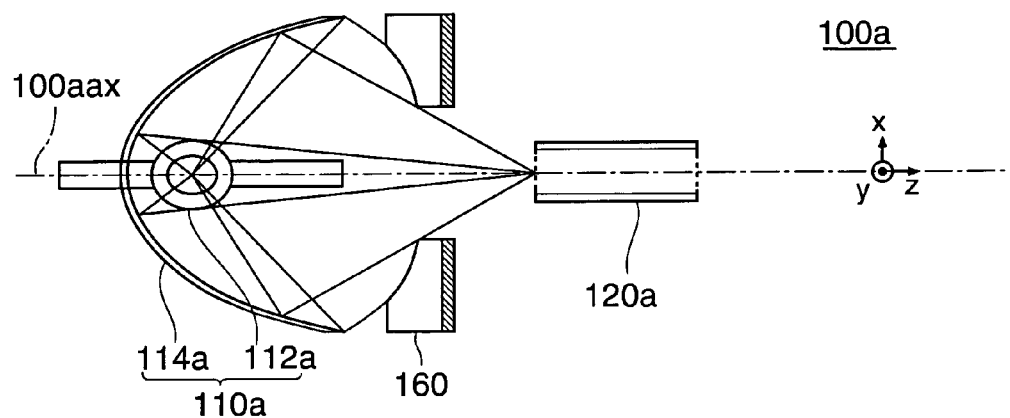
FIG. 3A is a top view of an illumination system including a light source in a projector of a comparative example.
Figure 3B:
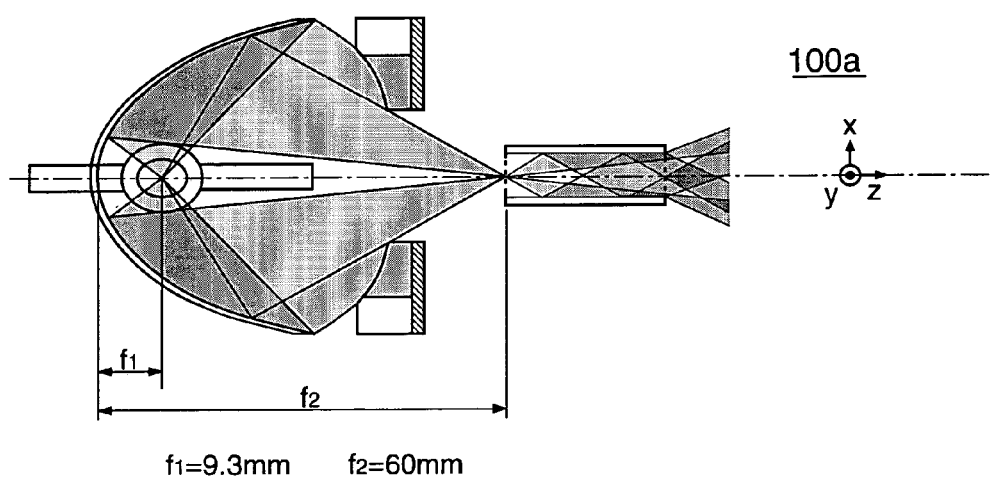
FIG. 3B is a top view of the illumination system incorporating illumination light of the comparative example.

FIGS. 3A and 3B are explanatory diagrams of the light source 110a of the projector 1000a of a comparative example, wherein FIG. 3A is a top view of the illumination system 100a including the light source 110a, and FIG. 3B is a top view of the illumination system 100a incorporating illumination light.

In the projector 1000A according to the first exemplary embodiment, as shown in FIG. 2B, a first focal length $f_1$ of the ellipsoidal reflector 114A is 9.3 mm, a second focal length $f_2$ of the ellipsoidal reflector 114A is 60 mm, and the diameter D of the effective reflective surface of the ellipsoidal reflector 114A is 36 mm.

Thus, since the first focal length $f_1$ of the ellipsoidal reflector 114A is 9.3 mm in the projector 1000A according to the first exemplary embodiment, the bulb portion of the arc tube 112 and the base of the ellipsoidal reflector 114A do not come into contact with each other. Also there is no need to use a large ellipsoidal reflector having a large-diameter effective reflective surface to ensure high incidence of light from the arc tube.

Since the second focal length $f_2$ of the ellipsoidal reflector 114A is 60 mm in the projector 1000A according to the first exemplary embodiment, the distal end of the lead portion of the arc tube 112 close to the region being illuminated, and the light incidence plane of the integrator rod 120A do not come in contact with each other.

Since the diameter D of the effective reflective surface of the ellipsoidal reflector 114A is 36 mm in the projector 1000A according to the first exemplary embodiment, the reflection area of the ellipsoidal reflector 114A that reflects the light from the arc tube 112 is large enough to provide a sufficient amount of light to the integrator rod 120A. Since the ellipsoidal reflector 114A itself is smaller than related art ellipsoidal reflectors, the illumination system 100A can be relatively decreased in size.

With the projector 1000A according to the first exemplary embodiment, the maximum angle θ made by the illumination light axis 100Aax of the illumination system 100A, at the base end of the ellipsoidal reflector 114A, and the light radiated from the luminescence center of the arc tube 112 toward the ellipsoidal reflector 114A, is 105°.

Accordingly, with the projector 1000A according to the first exemplary embodiment, the ellipsoidal reflector itself can be decreased in size as compared with the projector 1000a of the comparative example, as shown in FIGS. 2A, 2B, 3A, and 3B, so that the illumination system 100A can be decreased in size.

Although, the ellipsoidal reflector 114A in the projector 1000A according to the first exemplary embodiment is smaller than related art projectors, light emitted from the arc tube 112 at angles larger than 105° is reflected by the auxiliary mirror 116A onto the ellipsoidal reflector 114A, so that light utilization efficiency is not decreased.

As shown in FIGS. 1A and 1B, the projector 1000A according to the first exemplary embodiment further includes the color wheel 130 disposed on the light exiting plane side of the integrator rod 120A.

Accordingly, with the projector 1000A according to the first exemplary embodiment, the angle of the converging light emitted from the light source 110A can be decreased, so that the angle of the converging light incident on the integrator rod 120A can be decreased. Thus, the angle of light exiting from the integrator rod 120A can be decreased, thus reducing the blurring of images on the image forming region of the micromirror modulator 200 on the boundaries of the color filters of the color wheel 130, improving color reproducibility.

[Second Exemplary Embodiment]

Figure 4A:
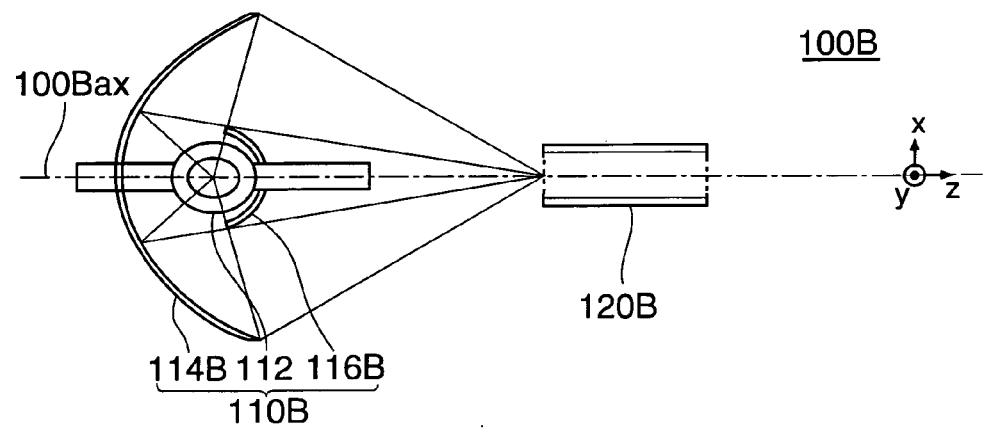
FIG. 4A is a top view of an illumination system including a light source according to a second exemplary embodiment.
Figure 4B:
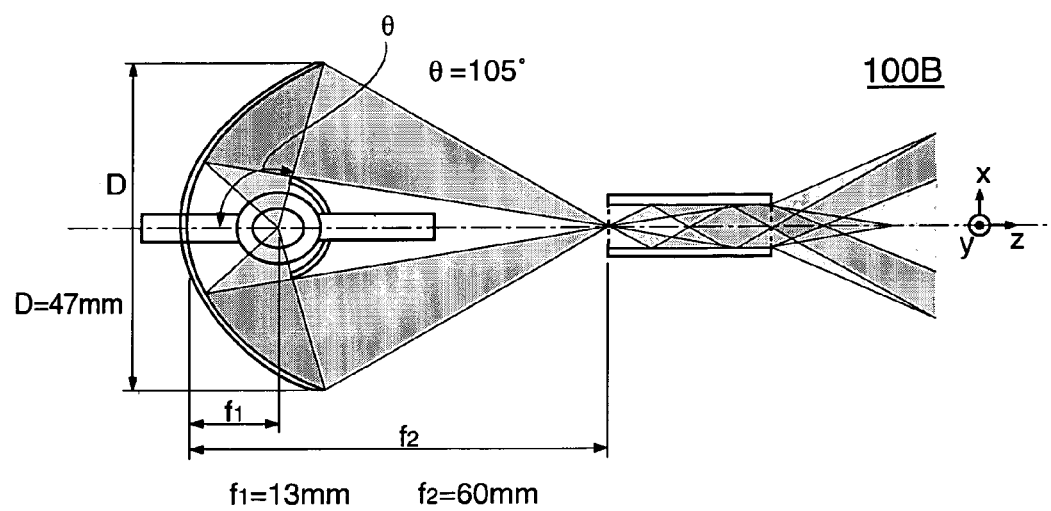
FIG. 4B is a top view of the illumination system incorporating illumination light according to the second exemplary embodiment.

FIGS. 4A and 4B are explanatory diagrams of a light source 110B of a projector 1000B according to a second exemplary embodiment, wherein FIG. 4A is a top view of an illumination system 100B including the light source 110B, and FIG. 4B is a top view of the illumination system 100B incorporating illumination light.

The projector 1000B according to the second exemplary embodiment (not shown) principally has a structure similar to that of the projector 1000A according to the first exemplary embodiment, but is different in the structure of the light source 110B (and the structure of an integrator rod 120B), as shown in FIG. 4A.

Specifically, the projector 1000B according to the second exemplary embodiment uses an ellipsoidal reflector 114B in which the first focal length $f_1$ is 13 mm, the second focal length $f_2$ is 60 mm, and the diameter D of the effective reflective surface is 47 mm.

The projector 1000B according to the second exemplary embodiment is different from the projector 1000A according to the first exemplary embodiment in the structure of the light source (and the structure of the integrator rod), as described above. However, an auxiliary mirror 116B is attached to the arc tube 112 The auxiliary mirror 116B reflects the light radiated from the arc tube 112 toward the region being illuminated in the direction of the ellipsoidal reflector 114B, so that the angle of converging light emitted from the light source 110B can be decreased as in the projector 1000A according to the first exemplary embodiment. Thus, the angle of the converging light incident on the integrator rod 120B can be decreased, allowing the illumination-light utilization efficiency of the illumination system 100B to be increased easily.

Also, even if arc tubes vary to a non-negligible extent in shape and size of the bulb, the variations in the position of the electrodes, and the position of the luminescence center from one arc tube to another, as in the projector 1000A according to the first exemplary embodiment, can be eliminated by adjusting the position of the auxiliary mirror relative to the arc tube depending on the variations.

Accordingly, light utilization efficiency does not decrease and stray light does not increase in the projector 1000B having the micromirror modulator 200, according to the second exemplary embodiment, as in the projector 1000A according to the first exemplary embodiment.

Since the projector 1000B according to the second exemplary embodiment uses the ellipsoidal reflector 114B in which the first focal length $f_1$ is 13 mm, as described above, the distal end of the lead portion of the arc tube 112 close to the region being illuminated, and the light incidence plane of the integrator rod 120B do not come in contact with each other, as in the projector 1000A according to the first exemplary embodiment. Also the projector 1000B uses the ellipsoidal reflector 114B in which the second focal length $f_2$ is 60 mm, and the diameter D of the effective reflective surface is 47 mm, so that the reflection area of the ellipsoidal reflector 114B that reflects the light from the arc tube 112 is large enough to provide a sufficient amount of light to the integrator rod 120B.

In the projector 1000B according to the second exemplary embodiment, the maximum angle $\theta$ made by the illumination light axis 100Bax of the illumination system 100B at the base end of the ellipsoidal reflector 114B and the light radiated from the luminescence center of the arc tube 112 toward the ellipsoidal reflector 114B is 105°, as shown in FIG. 4B. In the projector 1000B according to the second exemplary embodiment, light emitted from the arc tube 112 at angles larger than 105° is reflected by the auxiliary mirror 116B onto the ellipsoidal reflector 114B, so that light utilization efficiency is not decreased.

With the projector 1000B according to the second exemplary embodiment, the maximum angle of incidence of the light to the integrator rod 120B is larger than that of the projector 1000A according to the first exemplary embodiment, having the advantage of providing high light-uniformization effect and decreasing the integrator rod in length.

[Third Exemplary Embodiment]

Figure 5A:
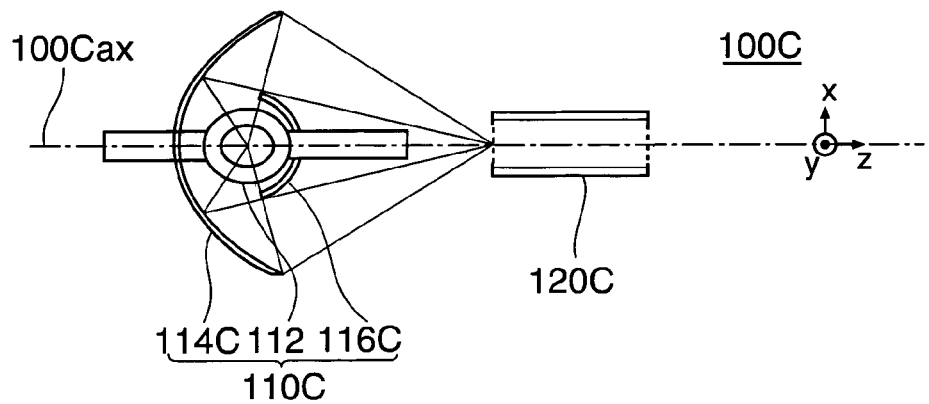
FIG. 5A is a top view of an illumination system including a light source according to a third exemplary embodiment.
Figure 5B:
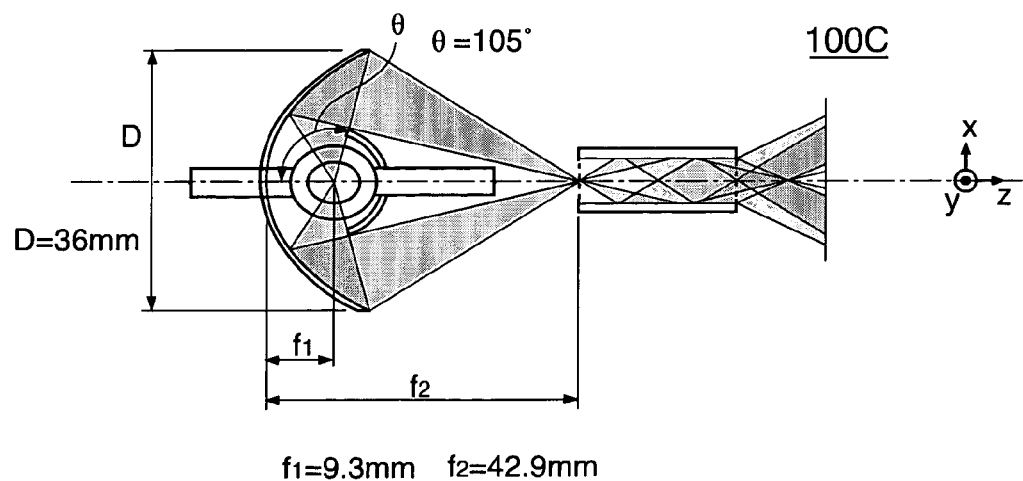
FIG. 5B is a top view of the illumination system incorporating illumination light according to the third exemplary embodiment.

FIGS. 5A and 5B are explanatory diagrams of a light source 110C of a projector 1000C according to a third exemplary embodiment, wherein FIG. 5A is a top view of an illumination system 100C including the light source 110C, and FIG. 5B is a top view of the illumination system 100C incorporating illumination light.

The projector 1000C according to the third exemplary embodiment (not shown) principally has a structure similar to that of the projector 1000A according to the first exemplary embodiment, but is different in the structure of the light source 110C (and the structure of an integrator rod 120C), as shown in FIG. 5A.

Specifically, the projector 1000C according to the third exemplary embodiment uses an ellipsoidal reflector 114C in which the first focal length $f_1$ is 9.3 mm, the second focal length $f_2$ is 42.9 mm, and the diameter D of the effective reflective surface is 36 mm.

The projector 1000C according to the third exemplary embodiment is different from the projector 1000A according to the first exemplary embodiment in the structure of the light source (and the structure of the integrator rod), as described above. However, an auxiliary mirror 116C is attached to the arc tube 112 The auxiliary mirror 116C reflects the light radiated from the arc tube 112 toward the region being illuminated in the direction of the ellipsoidal reflector 114C, so that the angle of converging light emitted from the light source 110C can be decreased as in the projector 1000A according to the first exemplary embodiment. Thus, the angle of the converging light incident on the integrator rod 120C can be decreased, allowing the illumination-light utilization efficiency of the illumination system 100C to be increased easily.

Also, even if arc tubes vary to a non-negligible extent in shape and size of the bulb, the position of the electrodes, and the position of the luminescence center from one arc tube to another, as in the projector 1000A according to the first exemplary embodiment, the variations can be eliminated by adjusting the position of the auxiliary mirror relative to the arc tube depending on the variations.

Accordingly, with the projector 1000C including the micromirror modulator 200 according to the third exemplary embodiment, light utilization efficiency does not decrease and stray light does not increase, as in the projector 1000A according to the first exemplary embodiment.

Since the projector 1000C according to the third exemplary embodiment uses the ellipsoidal reflector 114C in which the first focal length $f_1$ is 9.3 mm, as described above, the distal end of the lead portion of the arc tube 112 close to the region being illuminated and the light incidence plane of the integrator rod 120C do not come in contact with each other, as in the projector 1000A according to the first exemplary embodiment. Also the projector 1000C uses the ellipsoidal reflector 114C in which the second focal length $f_2$ is 42.9 mm, and the diameter D of the effective reflective surface is 36 mm, so that the reflection area of the ellipsoidal reflector 114C that reflects the light from the arc tube 112 is large enough to provide a sufficient amount of light to the integrator rod 120C. Since the ellipsoidal reflector 114C itself is smaller than related art ellipsoidal reflectors, the illumination system 100C can be decreased in size.

With the projector 1000C according to the third exemplary embodiment, the maximum angle $\theta$ made by the illumination light axis 100Cax of the illumination system 100C at the base end of the ellipsoidal reflector 114C, and the light radiated from the luminescence center of the arc tube 112 toward the ellipsoidal reflector 114C, is 105°, as shown in FIG. 5B.

Accordingly, with the projector 1000C according to the third exemplary embodiment, the ellipsoidal reflector 114C itself can be made smaller than that of the projector 1000a of the comparative example in FIGS. 3A and 3B, allowing the illumination system 100C to be reduced in size.

Although in the projector 1000C according to the third exemplary embodiment the ellipsoidal reflector 114C is smaller than related art ellipsoidal reflectors, light emitted from the arc tube 112 at angles larger than 105° is reflected by the auxiliary mirror 116C onto the ellipsoidal reflector 114C, so that light utilization efficiency is not decreased.

With the projector 1000C according to the third exemplary embodiment, the maximum angle of incidence of the light to the integrator rod 120C is larger than that of the projector 1000A according to the first exemplary embodiment, having the advantage of providing high light-uniformization effect and decreasing the integrator rod in length.

[Fourth Exemplary Embodiment]

How an auxiliary mirror 116D is mounted to an arc tube 112D will be described with reference to a fourth exemplary embodiment.

Figure 6:
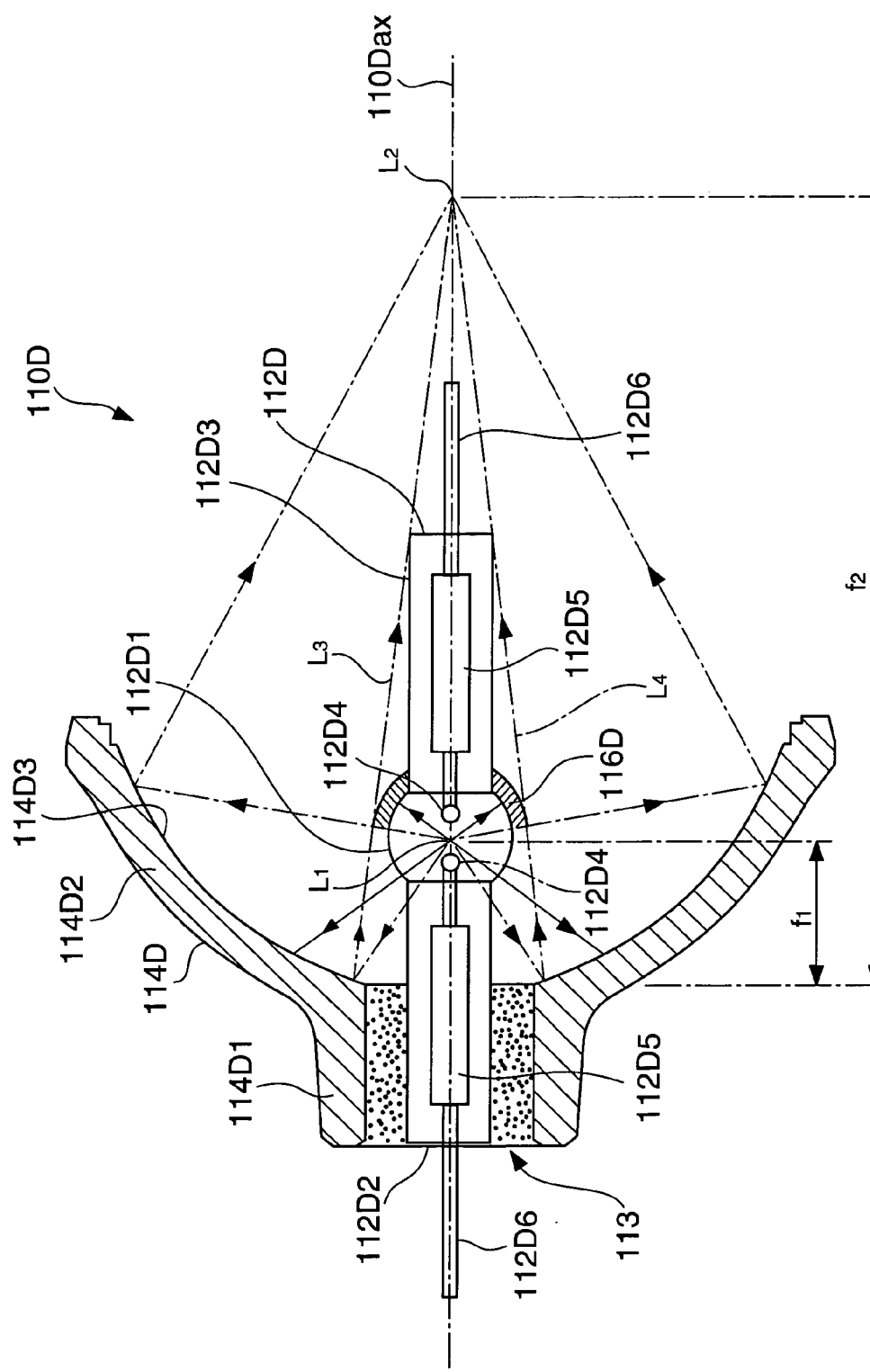
FIG. 6 is a cross sectional view of a light source used for a projector according to a fourth exemplary embodiment.

FIG. 6 is a cross sectional view of a light source 110D used for a projector 1000D (not shown) according to the fourth exemplary embodiment. FIG. 7 is an explanatory diagram of the arc tube 112D and the auxiliary mirror 116D in the light source 110D. FIGS. 8A and 8B are explanatory diagrams of the auxiliary mirror 116D, wherein FIG. 8A is a diagram of the auxiliary mirror 116D, as viewed along a light-source optical axis 110Dax, and FIG. 8B is a cross-sectional view of the auxiliary mirror 116D, taken along line A—A of FIG. 8A.

Figure 9A:
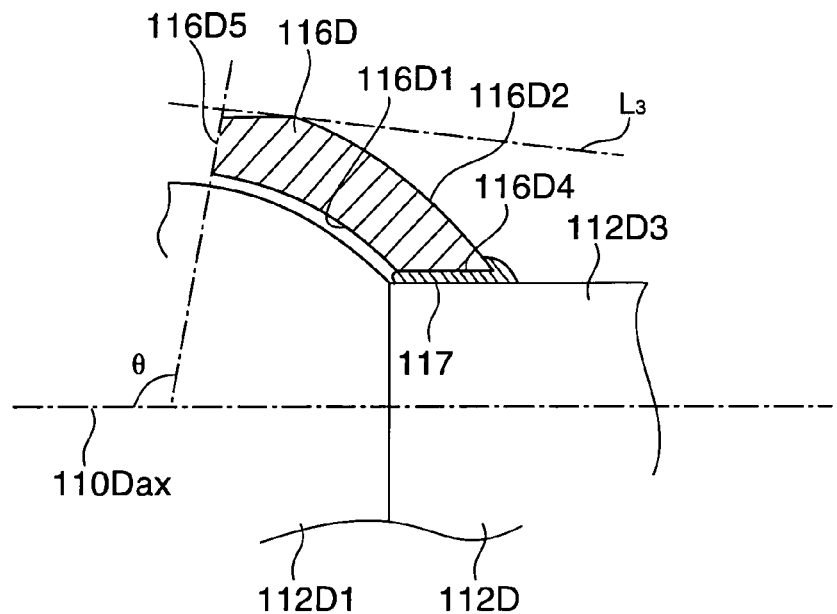
FIG. 9A is a partial cross-sectional view taken along the light-source optical axis of FIG. 7.
Figure 9B:
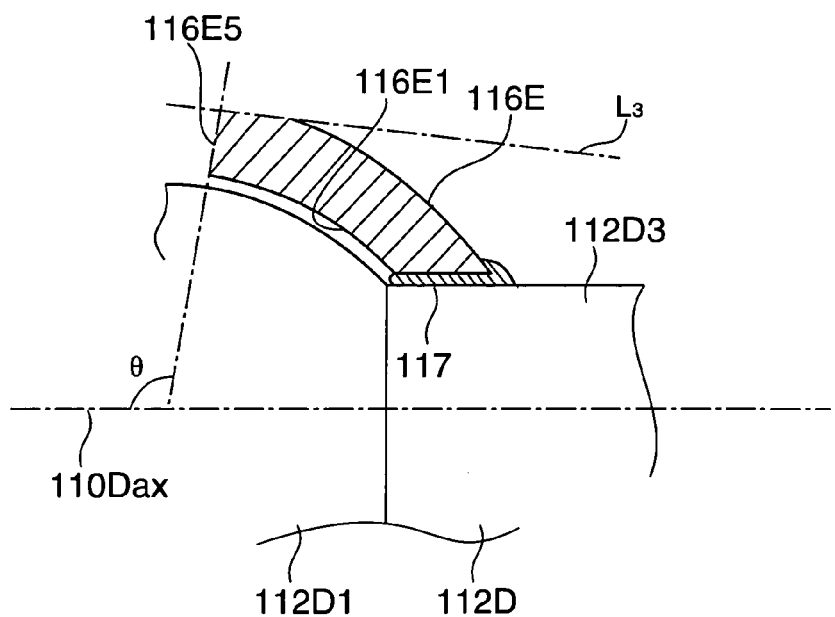
FIG. 9B is a partial cross-sectional view of a modification in an exemplary embodiment.
Figure 10A:
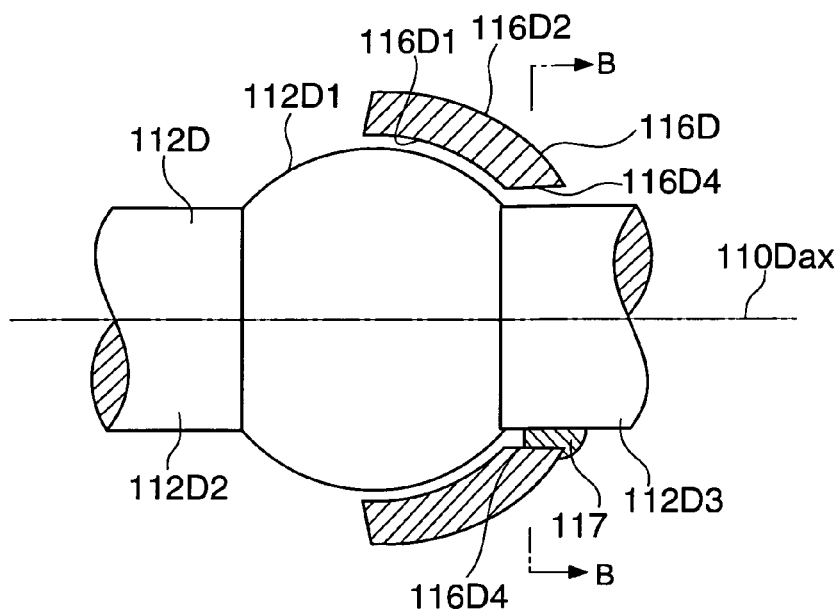
FIG. 10A is a partial cross-sectional view taken along the light-source optical axis of FIG. 7.
Figure 10B:
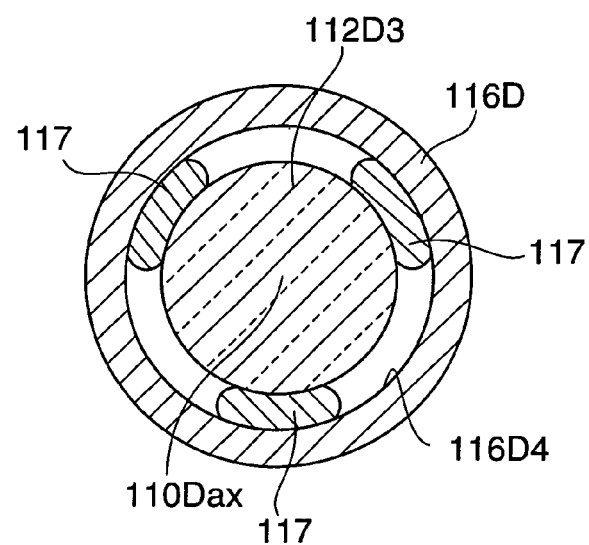
FIG. 10B is a cross-sectional view taken along line B—B of FIG. 10A.
Figure 11A:
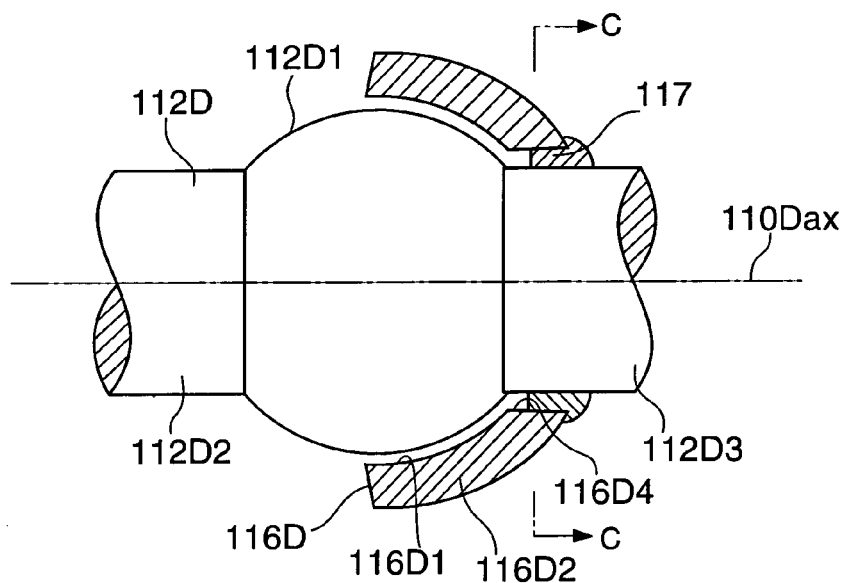
FIG. 11A is a partial cross-sectional view of a modification of the structure of FIG. 10A.
Figure 11B:
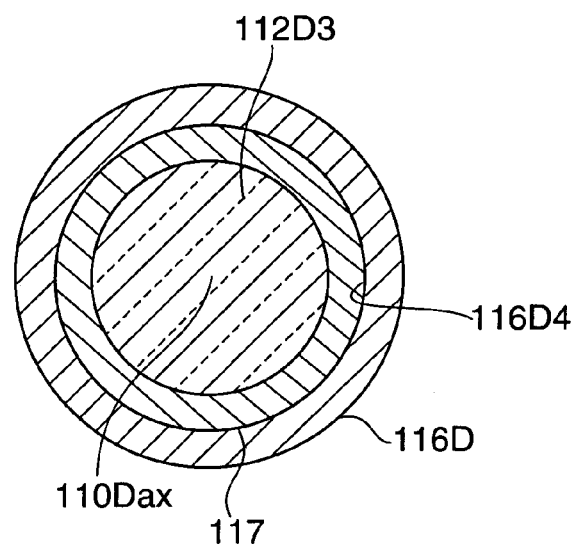
FIG. 11B is a cross-sectional view taken along line C—C of FIG. 11A.
Figure 12A:
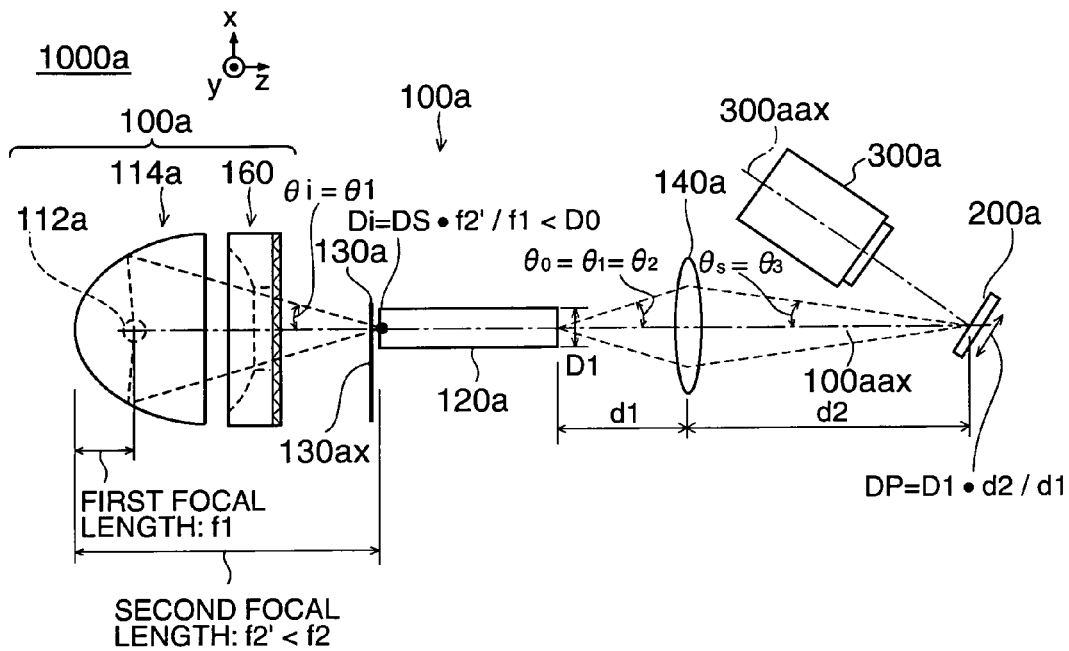
FIG. 12A is an explanatory diagram of the optical system of a related-art projector including a micromirror modulator.
Figure 12B:
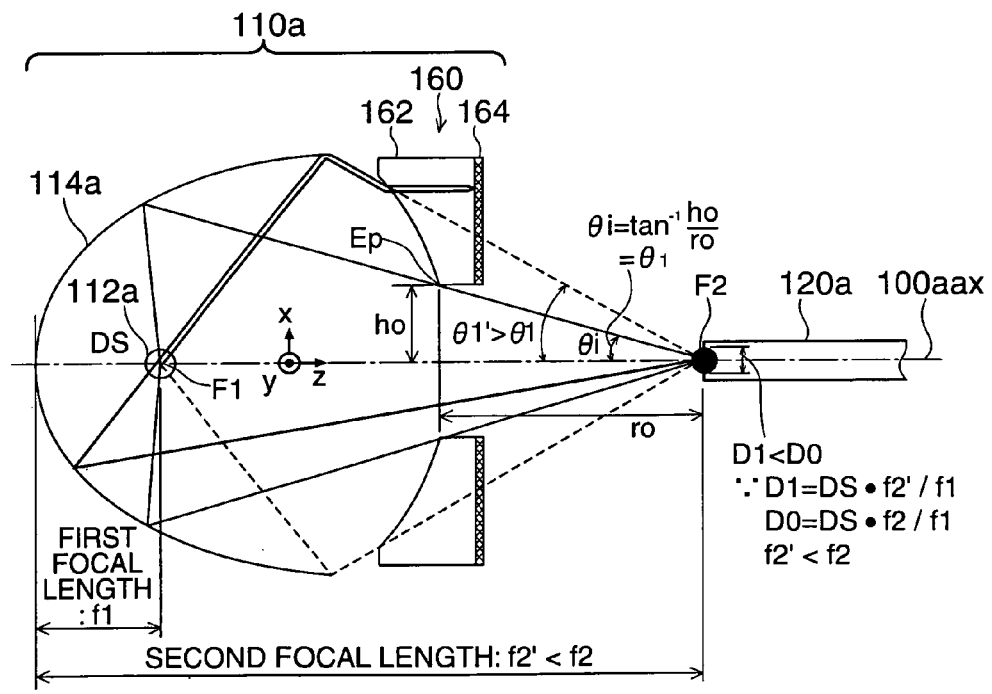
FIG. 12B is an explanatory diagram of a light source of the related-art projector including a micromirror modulator.
Figure 13:
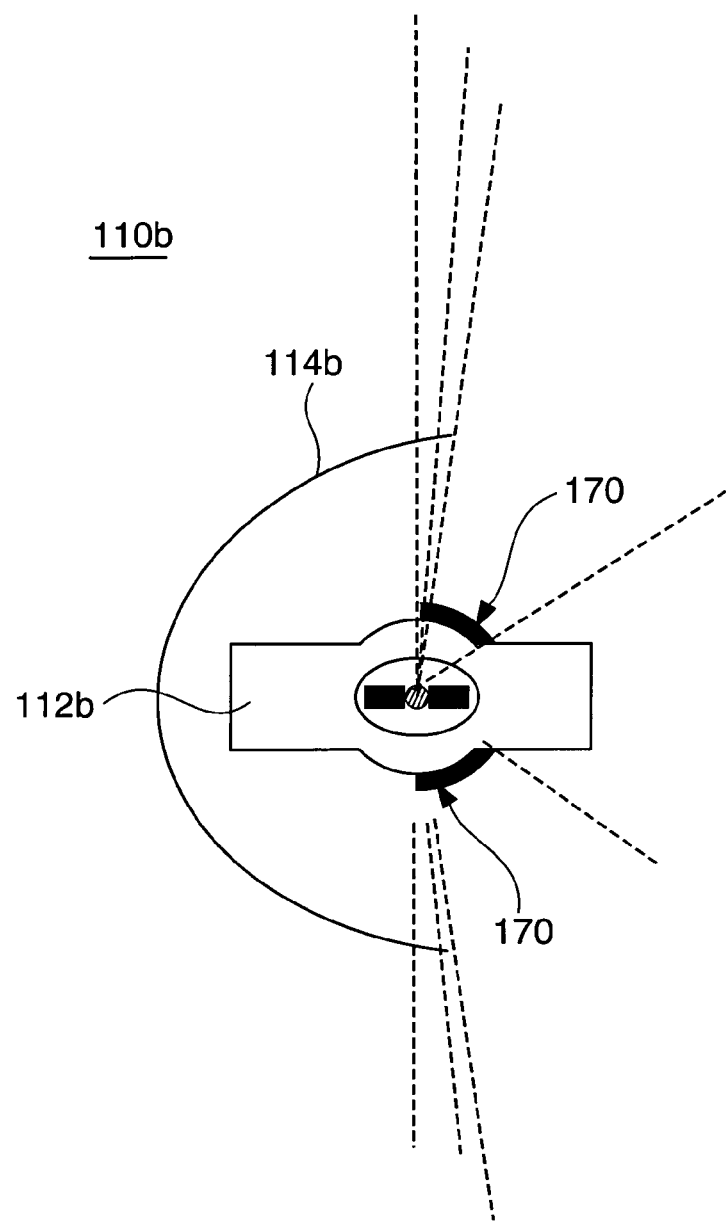
FIG. 13 is a diagram of another related-art light source.

FIGS. 9A and 9B illustrate how the auxiliary mirror 116D is mounted to the arc tube 112D, wherein FIG. 9A is a partial cross-sectional view taken along the light-source optical axis 110Dax of FIG. 7, and FIG. 9B is a partial cross-sectional view of a modification. FIGS. 10A and 10B illustrate how the auxiliary mirror 116D is mounted to the arc tube 112D, wherein FIG. 10A is a partial cross-sectional view taken along the light-source optical axis 110Dax of FIG. 7, and FIG. 10B is a cross-sectional view taken along line B—B of FIG. 10A. FIGS. 11A and 11B illustrate how the auxiliary mirror 116D is mounted to the arc tube 112D, wherein FIG. 11A is a partial cross-sectional view of a modification of the structure of FIG. 10A, and FIG. 11B is a cross-sectional view taken along line C—C of FIG. 11A.

The structure of the light source 110D used for the projector 1000D ((not shown), according to the fourth exemplary embodiment, will be described first. The projector 1000D according to the fourth exemplary embodiment principally has the same structure as that of the projector 1000A according to the first exemplary embodiment.

As shown in FIG. 6, the light source 110D includes the arc tube 112D inside an ellipsoidal reflector 114D. In the fourth exemplary embodiment, the light exiting direction of the light source 110D is shown as the distal end, and the direction opposite to the light exiting direction is shown as the base end.

The arc tube 112D is a quartz-glass tube that expands in the center to form a globe shape, and has an illuminator 112D1 in the center and sealed portions 112D2 and 112D3 that extend from the illuminator 112D1 to the front and back.

The illuminator 112D1 encloses a pair of tungsten electrodes 112D4 disposed a specified distance apart from each other, as well as mercury, rare gas, and a small amount of halogen.

The sealed portions 112D2 and 112D3 extending to the front and back of the illuminator 112D1 each contain a molybdenum metal foil 112D5 that connects electrically to the electrode 112D4 of the illuminator 112D1, and are sealed by glass or the like. Each of the metal foils 112D5 further connects to a lead wire 112D6 serving as electrode lead, the lead wires 112D6 extending outside the arc tube 112D.

When voltage is applied to the lead wires 112D6, a potential difference is generated between the electrodes 112D4 via the metal foils 112D5 to discharge electricity, generating an arc image D to illuminate the illuminator 112D1, as shown in FIG. 7.

As shown in FIG. 6, the ellipsoidal reflector 114D is a glass molding having a neck portion 114D1 for the sealed portion 112D2 at the base end of the arc tube 112D to pass through, and an ellipsoidal reflecting portion 114D2 expanding from the neck portion 114D1.

The neck portion 114D1 has an insertion hole 113 in the center, in the center of which the sealed portion 112D2 is disposed.

The reflecting portion 114D2 is made by evaporating a metal thin film onto the ellipsoidal glass surface. The reflective surface 114D3 of the reflecting portion 114D2 is a cold mirror that reflects visible light and transmits infrared and ultraviolet light.

The reflective surface 114D3 of the ellipsoidal reflector 114D is an ellipsoid having a first focus $L_1$ and a second focus $L_2$, the first focus $L_1$ and the second focus $L_2$ being on the light-source optical axis 110Dax.

The arc tube 112D is disposed inside the reflecting portion 114D2 of the ellipsoidal reflector 114D such that the illuminance center between the electrodes 112D4 in the illuminator 112D1 is close to the first focus $L_1$.

When the arc tube 112D is lit on, the light radiated from the illuminator 112D1 is reflected by the reflective surface 114D3 of the reflecting portion 114D2 to be converged to the second focus $L_2$ of the ellipsoidal reflector 114D. The central axis of the light reflected by the ellipsoidal reflector 114D agrees substantially with the light-source optical axis 110Dax.

At that time, the inside of the corn defined by the boundary $L_3$ and the boundary $L_4$ that connect the second focus $L_2$ of the ellipsoidal reflector 114D with the distal ends of the sealed portion 112D3 at the distal end of the arc tube 112D forms a light unusable region that blocks off the light reflected by the ellipsoidal reflector 114D by the sealed portion 112D3, and so sends no light to the second focus $L_2$. In other words, the boundary $L_3$ and the boundary $L_4$ that connect the second focus $L_2$ of the ellipsoidal reflector 114D with the distal ends of the sealed portion 112D3 at the distal end of the arc tube 112D are boundary lights at the boundary between the light reflected by the ellipsoidal reflector 114D to reach the second focus $L_2$ and the light blocked off by the sealed portion 112D3.

To fix the arc tube 112D to the ellipsoidal reflector 114D, the sealed portion 112D2 at the rear of the arc tube 112D is inserted into the insertion hole 113 of the ellipsoidal reflector 114D such that the luminescence center between the electrodes 112D4 in the illuminator 112D1 is located in the vicinity of the first focus $L_1$ of the ellipsoidal reflector 114D, and then the insertion hole 113 is filled with an inorganic adhesive that is predominantly composed of silica/alumina.

The length of the reflecting portion 114D2 along the optical axis is shorter than that of the arc tube 112D. Thus, when the arc tube 112D is fixed to the ellipsoidal reflector 114D with such a structure, the sealed portion 112D3 at the front of the arc tube 112D projects from the opening of the ellipsoidal reflector 114D.

The auxiliary mirror 116D is a reflecting member that covers substantially the front half of the illuminator 112D1 of the arc tube 112D, and formed in the shape of a bowl whose inner surface forms a spherical reflective surface 116D1 and the outer surface 116D2 curves along the curve of the reflective surface 116D1, as shown in FIG. 8B. The reflective surface 116D1 has a reflection film formed by depositing a dielectric multilayer film. The reflection film forms a cold mirror as in the reflective surface 114D3 of the ellipsoidal reflector 114D.

The auxiliary mirror 116D has an opening 116D3 in the bottom of the bowl. The inner periphery of the opening 116D3 serves as a bonding surface 116D4 which is filled with an adhesive for fixing to the sealed portion 112D3, which will be described later.

The upper end face of the bowl of the auxiliary mirror 116D (the left end face in FIG. 8B) forms a slope 116D5 that decreases in the height of the bowl gradually from the rim of the reflective surface 116D1 toward the rim of the outer surface 116D2.

As shown in FIG. 9A, the slope 116D5 is shaped like a conical trapezoid that inclines along the maximum angle θ made by the base end of the light-source optical axis 110Dax and the light that is radiated from the illuminator 112D1 to be incident directly onto the ellipsoidal reflector 114D. In an exemplary embodiment, the maximum angle θ is about 105° or less to decrease the ellipsoidal reflector 114D in length along the light-source optical axis 110Dax.

The auxiliary mirror 116D is made of an inorganic material such as quartz and alumina ceramics, or quartz, transparent ceramics such as "Neoceram", sapphire, or alumina ceramics, specifically, which is manufactured by polishing a thick cylindrical member 116D6 having an outside diameter $D_1$ and an inside diameter $D_2$, as shown in FIG. 8B.

One end face of the cylindrical member 116D6 is first polished into a concave surface to form the reflective surface 116D1 and then the outer surface 116D2 is polished into a convex surface along the reflective surface 116D1 and the slope 116D5. Finally, a dielectric multilayer film made of tantalum pentoxide and silicon dioxide is evaporated onto the reflective surface 116D1.

The auxiliary mirror 116D is positioned relative to the illuminator 112D1 of the arc tube 112D so that the slope 116D5 is arranged along the maximum angle θ and the outer surface 116D2 does not extend off the corn defined by the boundary $L_3$ and the boundary $L_4$, as shown in FIG. 9A in the direction perpendicular to the light-source optical axis 110Dax. The maximum angle θ is made by the base end of the light-source optical axis 110Dax and the light radiated from the illuminator 112D1 to be incident directly onto the ellipsoidal reflector 114D.

In the fourth exemplary embodiment, the slope 116D5 inclines along the maximum angle θ. However, as shown in FIG. 9B, an auxiliary mirror 116E may be disposed such that the end face 116E5 intersects to the light-source optical axis 110Dax at right angles, if the amount of light that is blocked off the end face 116E5 of the auxiliary mirror 116E without entering on the reflective surface 116E1 of the auxiliary mirror 116E is small.

As shown in FIG. 9A, the auxiliary mirror 116D is fixed to the arc tube 112D with an adhesive 117 interposed between the bonding surface 116D4 and the outer surface of the sealed portion 112D3 at the distal end of the arc tube 112D. The adhesive 117 is applied such that it is heaped up on the outer surface 116D2 of the auxiliary mirror 116D. The material of the adhesive 117 can be a silica/aluminum based inorganic adhesive as in the case of bonding the arc tube 112D to the ellipsoidal reflector 114D.

The adhesive 117 may be applied intermittently around the light-source optical axis 110Dax, as shown in FIGS. 10A and 10B, or alternatively, may be applied all around the light-source optical axis 110Dax, as shown in FIGS. 11A and 11B.

In the projector 1000D according to the fourth exemplary embodiment, the auxiliary mirror 116D is fixed to the arc tube 112D after its position relative to the arc tube 112D is adjusted, as described above. Accordingly, after the mounting position of the auxiliary mirror 116D to the arc tube 112D has been adjusted to eliminate the variation of the arc tube 112D, then the auxiliary mirror 116D is fixed to the arc tube 112D. Thus, the auxiliary mirror 116D, after being fixed, can accurately reflect the light radiated from the arc tube 112D toward the region being illuminated onto the illuminator (luminescence center) of the arc tube 112D. The light that has passed through the illuminator of the arc tube 112D is then accurately reflected by the ellipsoidal reflector 114D to reach the light incidence plane of the integrator rod. Thus, preventing a decrease in light utilization efficiency and an increase in stray light.

In the projector 1000D according to the fourth exemplary embodiment, the auxiliary mirror 116D is fixed to the sealed portion 112D3 of the arc tube 112D opposite to the ellipsoidal reflector 114D. This facilitates the work to adjust the position of the auxiliary mirror 116D relative to the arc tube 112D and then to fix the auxiliary mirror 116D to the arc tube 112D.

The projector according to the exemplary embodiments described herein with reference to the figures is not limited to the features described herein. Various modifications can be made without departing from the spirit and scope of the exemplary embodiments. For example, the following modifications can be made.

The projectors 1000 to 1000D of the exemplary embodiments use a color wheel disposed on the light exiting side of the integrator rod, to make a single-plate projector having one micromirror modulator a full-color projector. The exemplary embodiments are not limited to a color wheel disposed on the light exiting side, but may be a projector having a color wheel disposed on the light incident side of the integrator rod.

What is claimed is:

1. A projector, comprising:
an illumination system including a light source having an ellipsoidal reflector and an arc tube having a luminescence center in the vicinity of a first focus of the ellipsoidal reflector, and an integrator rod having a light incidence plane in the vicinity of a second focus of the ellipsoidal reflector and converting light from the light source to light having a more even intensity distribution;
a relay optical system that guides the light from the illumination system to a region being illuminated;
a micromirror modulator that modulates the light from the relay optical system in accordance with image information; and
a projection optical system that projects the light modulated by the micromirror modulator;
the arc tube including an auxiliary mirror that reflects light radiated from the arc tube toward the region being illuminated into a direction of the ellipsoidal reflector.

2. The projector according to claim 1,
the auxiliary mirror being fixed to the arc tube after the position of the auxiliary mirror relative to the arc tube has been adjusted.

3. The projector according to claim 1,
the auxiliary mirror being fixed to a sealed portion of the arc tube opposite to the ellipsoidal reflector.

4. The projector according to claim 1,
the auxiliary mirror being made of quartz glass.

5. The projector according to claim 1,
the auxiliary mirror having an inner side surface and dielectric-multilayer reflection film on the inner side surface.

6. The projector according to claim 1,
the ellipsoidal reflector being provided such that 6 mm≦$f_1$≦18 mm, where $f_1$ is a first focal length of the ellipsoidal reflector.

7. The projector according to claim 1,
the ellipsoidal reflector being provided such that 30 mm≦$f_2$≦90 mm, where $f_2$ is a second focal length of the ellipsoidal reflector.

8. The projector according to claim 1,
the ellipsoidal reflector being provided such that 30 mm≦D≦50 mm, where D is the diameter of the effective reflective surface of the ellipsoidal reflector.

9. The projector according to claim 1,
the illumination system being provided such that 90°≦θ≦110°, where θ is the maximum angle made by the illumination light axis of the illumination system at the base end of the ellipsoidal reflector and the light radiated from the luminescence center of the arc tube toward the ellipsoidal reflector.

10. The projector according to claim 1, further comprising:
a color wheel disposed on the light exiting plane of the integrator rod.

* * * * *